US011211056B1

(12) United States Patent
Bissell et al.

(10) Patent No.: US 11,211,056 B1
(45) Date of Patent: Dec. 28, 2021

(54) NATURAL LANGUAGE UNDERSTANDING MODEL GENERATION

(71) Applicant: Amazon Technologies, Inc., Seattle, WA (US)

(72) Inventors: Anthony Bissell, Somerville, MA (US); Pragati Verma, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 398 days.

(21) Appl. No.: 16/389,390

(22) Filed: Apr. 19, 2019

(51) Int. Cl.
*G10L 15/18* (2013.01)
*G10L 15/22* (2006.01)
*G10L 15/30* (2013.01)
*G10L 15/193* (2013.01)

(52) U.S. Cl.
CPC ........ *G10L 15/1815* (2013.01); *G10L 15/193* (2013.01); *G10L 15/22* (2013.01); *G10L 15/30* (2013.01)

(58) Field of Classification Search
CPC ... G10L 15/1815; G10L 15/30; G10L 15/193; G10L 15/22
USPC ......................................................... 704/257
See application file for complete search history.

(56) References Cited

U.S. PATENT DOCUMENTS

| | | | |
|---|---|---|---|
| 10,249,296 B1 * | 4/2019 | Mutagi | G10L 15/1822 |
| 10,558,738 B1 * | 2/2020 | Strimel | G10L 15/26 |
| 10,685,669 B1 * | 6/2020 | Lan | G10L 15/1822 |
| 10,929,458 B2 * | 2/2021 | Tamir | G10L 15/26 |
| 2006/0122836 A1 * | 6/2006 | Cross, Jr. | H04M 3/493 704/260 |
| 2014/0047001 A1 * | 2/2014 | Phillips | H04L 65/403 709/202 |
| 2016/0188150 A1 * | 6/2016 | Abida | G06F 3/04817 715/769 |
| 2016/0217124 A1 * | 7/2016 | Sarikaya | G06F 40/216 |
| 2016/0260029 A1 * | 9/2016 | Gelfenbeyn | G06F 40/30 |
| 2017/0163435 A1 * | 6/2017 | Ehsani | G06F 40/35 |
| 2017/0169811 A1 * | 6/2017 | Sabbavarapu | G06F 3/165 |
| 2017/0278514 A1 * | 9/2017 | Mathias | G10L 15/22 |
| 2018/0060303 A1 * | 3/2018 | Sarikaya | G10L 15/22 |
| 2019/0043622 A1 * | 2/2019 | Ramaci | G16H 20/10 |
| 2020/0395008 A1 * | 12/2020 | Cohen | G06F 40/205 |

* cited by examiner

*Primary Examiner* — Edwin S Leland, III
(74) *Attorney, Agent, or Firm* — Pierce Atwood LLP

(57) ABSTRACT

Systems and techniques for generating natural language understanding (NLU) models are described. A developer of an NLU model may provide data representing runtime NLU functionality. For example, a developer may provide one or more sample natural language user inputs. The NLU model generation system may expand data, provided by the developer, to result in a more robust NLU model for use at runtime. For example, the NLU model generation system may expand sample natural language user inputs, may translate sample natural language user inputs into other languages, etc. The present disclosure also provides a mechanism for transitioning between using NLU models of a first NLU model generation system and NLU models of a second NLU model generation system.

20 Claims, 13 Drawing Sheets

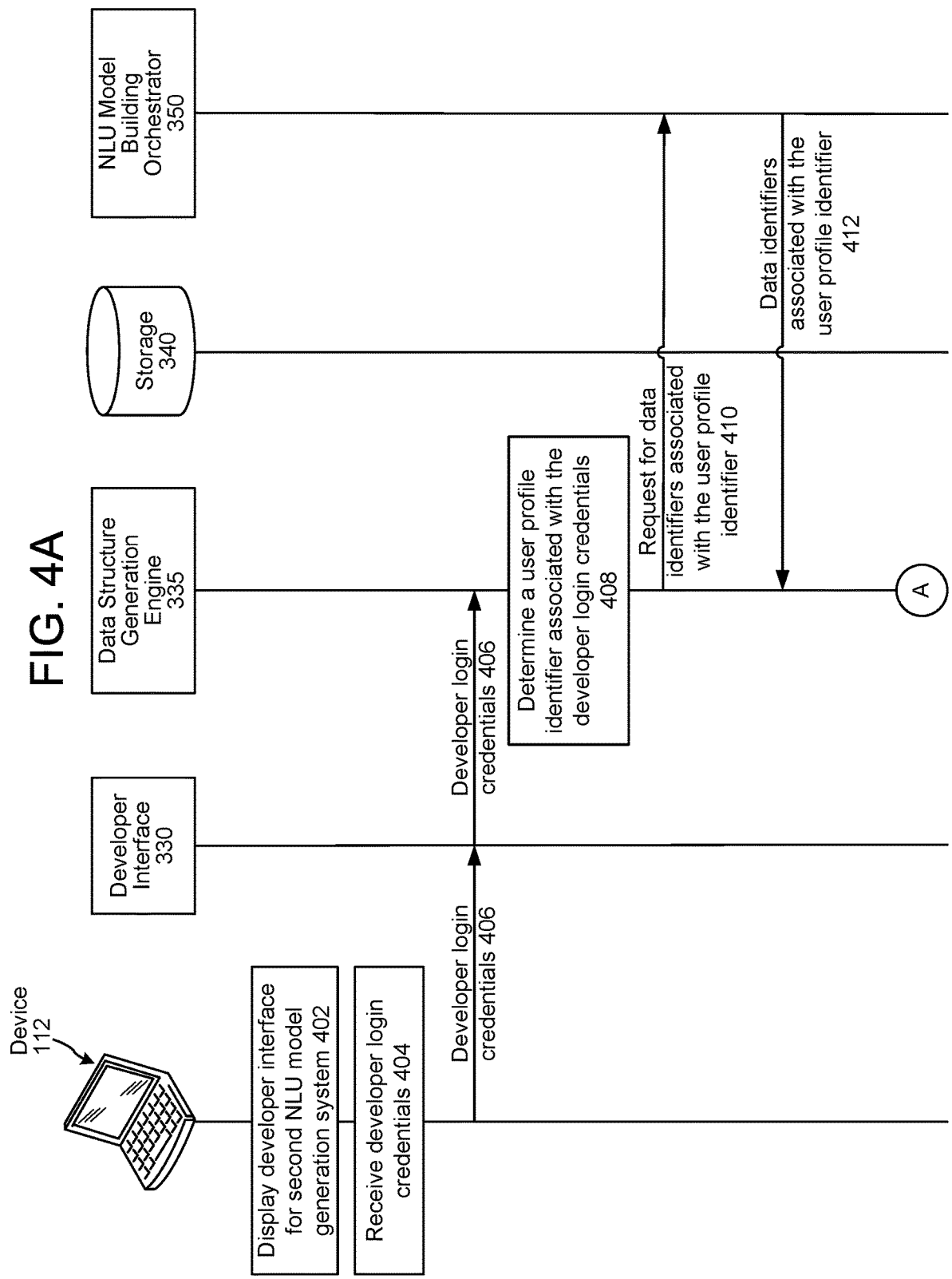

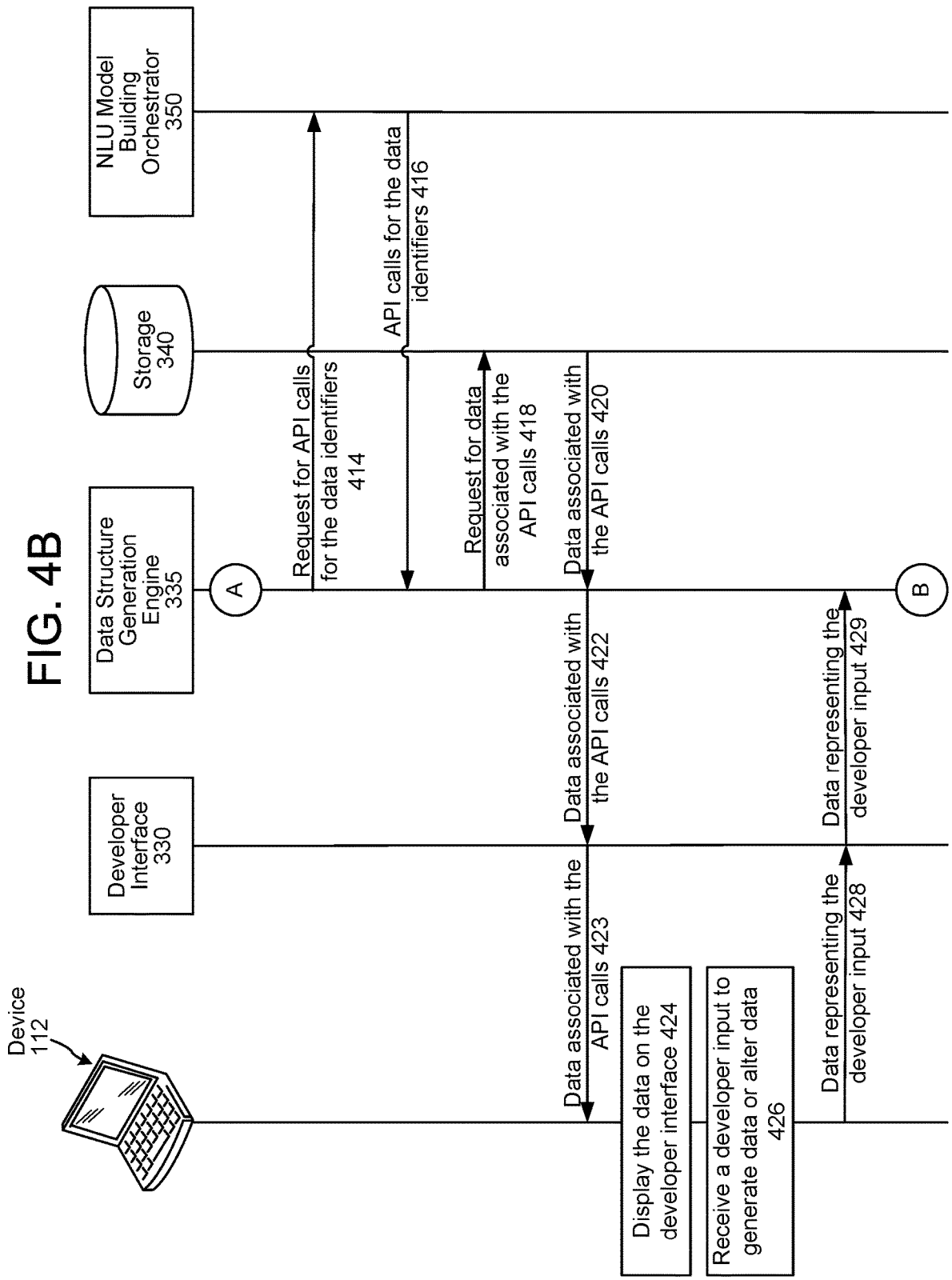

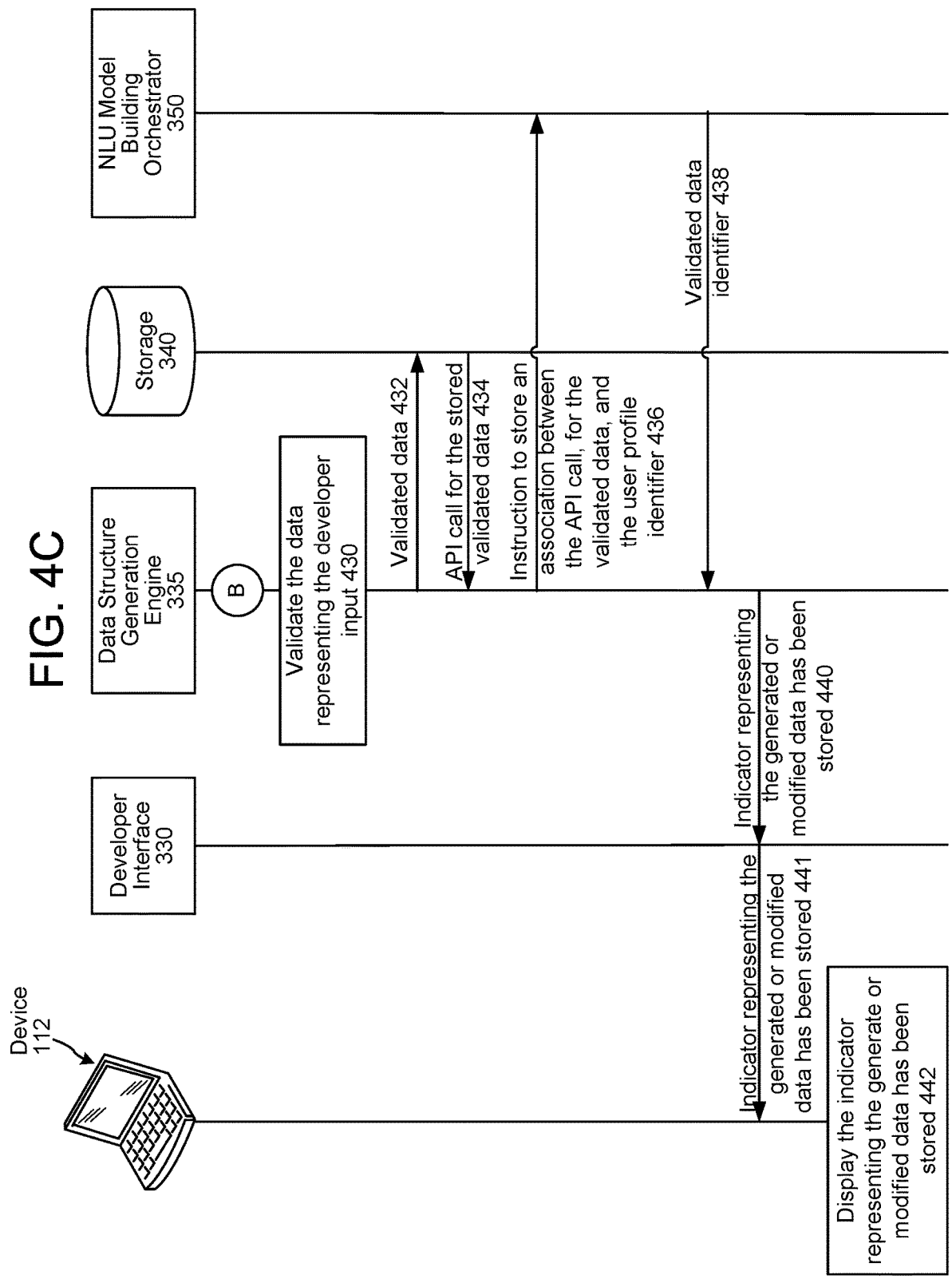

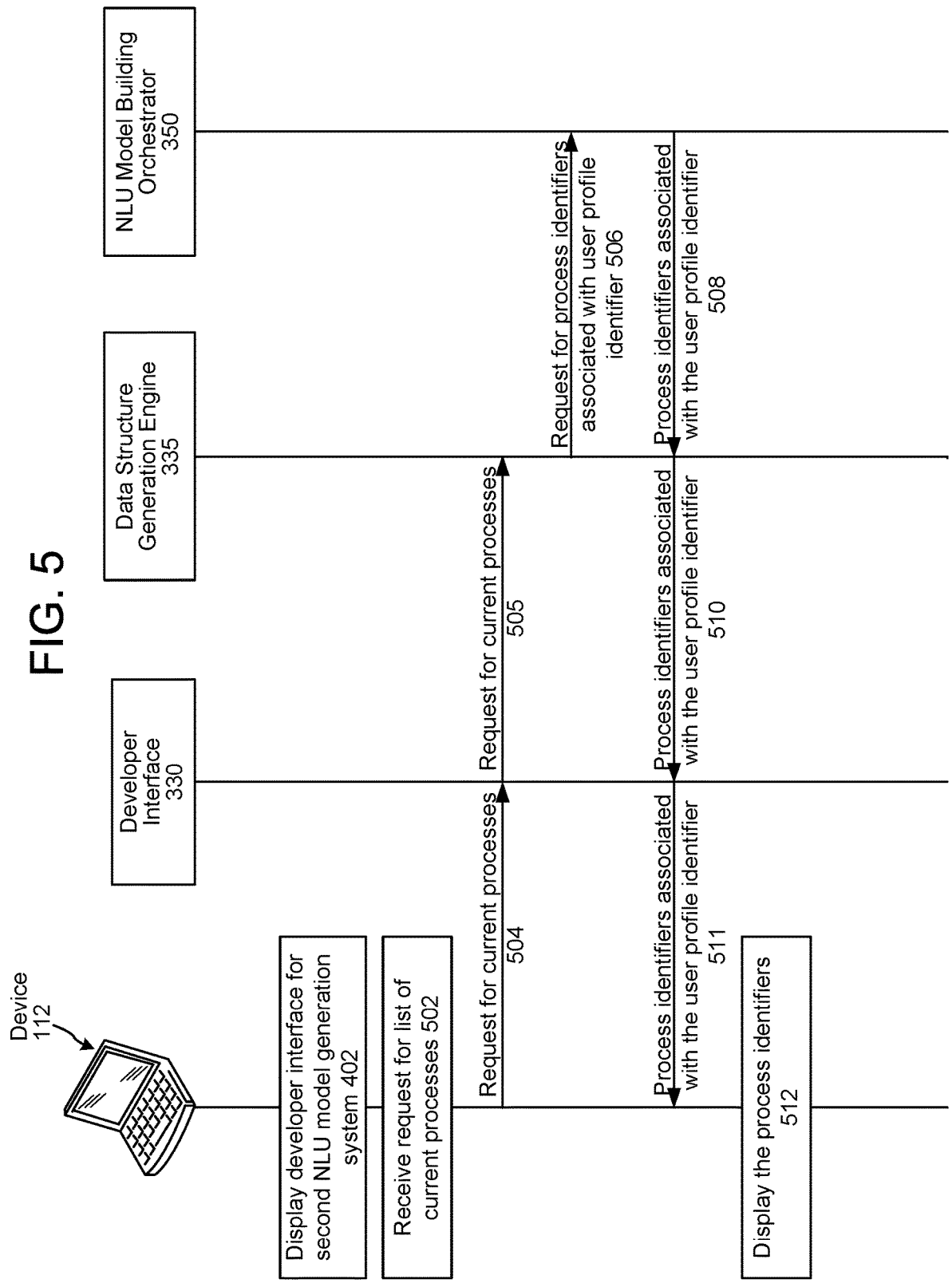

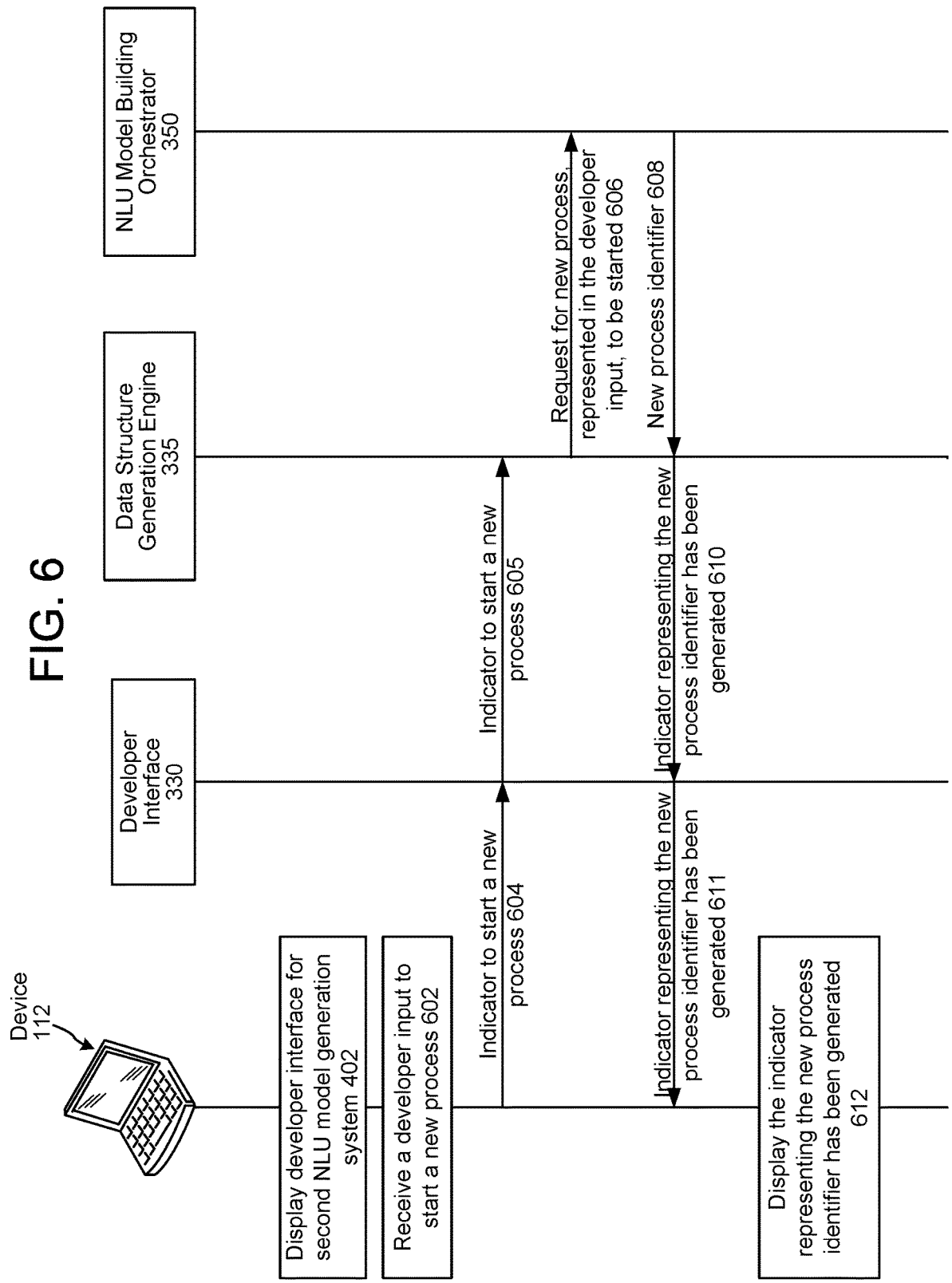

NATURAL LANGUAGE UNDERSTANDING MODEL GENERATION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 4A through 4C are a signal flow diagram illustrating processing that may be performed by a second NLU model generation system when a developer wants to generate or alter data that may be used to generate a component of an NLU model, in accordance with embodiments of the present disclosure.

FIG. 5 is a signal flow diagram illustrating processing to display present processing being performed with respect to a user profile identifier, in accordance with embodiments of the present disclosure.

FIG. 6 is a signal flow diagram illustrating processing to generate a new process with respect to a user profile identifier, in accordance with embodiments of the present disclosure.

DETAILED DESCRIPTION

Figure 1:
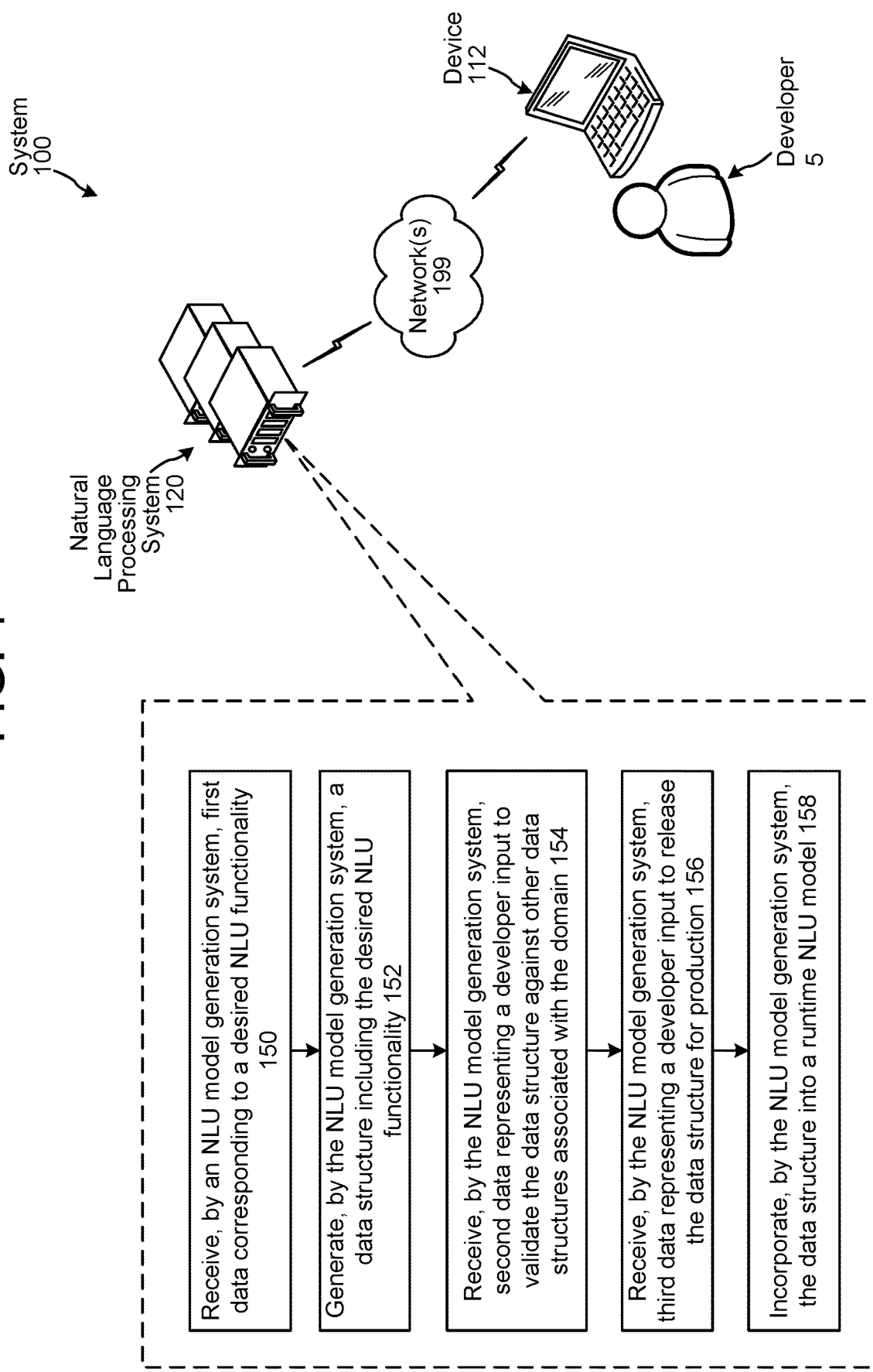
FIG. 1 illustrates a system for generating a data structure for incorporation into an NLU model for use at runtime, in accordance with embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

A system may be configured to perform actions in response to natural language user inputs. For example, for the user input of "play Adele music," a system may output music sung by an artist named Adele. For further example, for the user input of "turn on the lights," a system may turn on "smart" lights associated with the user's profile.

To respond to such natural language user inputs, a system may implement, at runtime, NLU models configured to perform one or more NLU operations such as intent classification, entity recognition, or others, such as those described below. An NLU model may be associated with a skill. As used herein, a "skill," and derivations thereof, may refer to software, running on a system, that is akin to a software application running on a traditional computing device. That is, a skill may enable a system to execute specific functionality in order to provide data or produce some other requested output. Example skills may include weather information skills, music playing skills, or the like. While "skill" and derivatives thereof may be used herein, the functionality described herein as a skill may be referred to using many different terms, such as an action, bot, app, or the like. During runtime system operation, when the system evaluates a user input, an NLU model may generate a representation of a natural language user input, where the representation may be further processable by a corresponding skill to perform an action to output data or perform some other functionality (e.g., output weather data, play a song, etc.).

A system may include an NLU model generation system that provides functionality for a developer to input and alter data for the purpose of generating NLU models to be used at runtime. As used herein, an "NLU model" may include a statistical model, a deterministic model, a rule-based model with associated NLU grammars, or some other type of model that may be used at runtime to perform NLU processing.

A developer may use the NLU model generation system to generate an NLU model tailored to specific functionality (e.g., functionality provided by a particular skill). For example, the NLU model generation system may enable a developer to define exact match rules, domain definitions (e.g., intent indicators (representing intents that user inputs may correspond to at runtime to invoke an NLU model), slot indicators (representing portions of user inputs that may be included in user inputs at runtime to invoke an NLU model), etc.), pattern match rules, statistical model training data (e.g., data used to train a statistical NLU model for runtime processing), etc. for a particular NLU model. As used herein, an "exact match rule," and derivatives thereof, may refer to text data labeled as one or more exact user inputs that may be received at runtime to invoke an NLU model generated from the exact match rule. As used herein, a "domain," and derivatives thereof, may refer to a grouping of like functionality provided by the natural language processing system. Example domains include smart home, music, video, flash briefing, shopping, and custom (e.g., functionality that is not associated with any pre-configured domain).

The present disclosure provides a system and techniques for generating data structures that may be incorporated into an NLU model (e.g., corresponding to more than one skill, more than one type of device, etc.) for runtime processing. The herein disclosed system and techniques provide, among other things, an improved developer experience. As used herein, a "developer" may be a user of the system that has specific permissions to generate and alter data that is to be incorporated into a runtime NLU model (e.g., corresponding to more than one skill, more than one type of device, etc.). As used herein, "runtime" refers to a period of time when a natural language processing system is executing to perform actions responsive to natural language user inputs. The present disclosure provides a unified NLU modeling developer experience for authoring data structures, testing the data structures, and releasing the data structures for production (e.g., for incorporation into an NLU model for runtime operation). The NLU model generation system may provide, in some instances, a web-based developer interface (a form of user interface) that permits a developer to edit data structures without needing to understand, for example, parameters of the data structures, ramifications of making changes, etc.

A developer may provide data representing runtime NLU functionality. As used herein, "runtime NLU functionality" may refer to processing, performed at runtime, to determine a whether a natural language user input corresponds to the data provided by the developer. For example, a developer may provide one or more sample natural language user inputs for interacting with a skill or particular kind of device. In this example, corresponding runtime NLU functionality may determine whether a natural language user input corresponding to the one or more sample natural language user inputs. For further example, a developer may provide FST data. In this example, corresponding runtime NLU functionality may try to traverse the FST data using a natural language user input.

The developer-provided data may correspond to runtime NLU functionality for a skill. The developer-provided data may additionally or alternatively correspond to runtime NLU functionality for a particular type of device.

The NLU model generation system may expand the developer-provided data to result in a more robust NLU model for use at runtime. For example, certain sample natural language user inputs (provided by a developer) that might be used to interact with a skill and may be used to create other potential natural language user inputs that users may also use to interact with the skill (e.g., alternate phrasings of invocation utterances that the system can create using the examples provided by a developer). This allows the system to make a developer's skill more robust than it may otherwise have been. Further, sample natural language user inputs (either created by the developer and/or created by the system) may be translated into other languages to allow the skill to be used in another language. Other expansions/adjustments may be undertaken to expand a skill's capabilities, such as those discussed herein.

The present disclosure also provides a mechanism for transitioning between using NLU models of a first NLU model generation system and NLU models of a second NLU model generation system.

FIG. 1 shows a system 100 configured to generate a data structure for incorporation into an NLU model (e.g., corresponding to more than one skill, more than one type of device, etc.) for use at runtime. Although the figures and discussion illustrate certain operational steps of the system in a particular order, the steps described may be performed in a different order (as well as certain steps removed or added) without departing from the intent of the disclosure. As shown in FIG. 1, the system 100 may include a device 112 local to a developer 5 and a natural language processing system 120 connected across one or more networks 199. The device 112 may be a desktop computer, laptop, tablet, smart phone, or other device that is capable of receiving developer inputs for generating data structures (e.g., which can be represented by source code) and releasing same for incorporation into runtime NLU models.

The developer 5, using the device 112, may log in to an NLU model generation system implemented by the natural language processing system 120. In at least some examples, the developer 5 may log in to the NLU model generation system using a web-based developer interface. After logging in, the developer 5 may provide the device 112 (and by extension the NLU model generation system) with a developer input (a user input corresponding to a developer) corresponding to a desired NLU functionality, or corresponding to an edit to a previously defined functionality.

After the NLU model generation system receives (150) the data representing the desired functionality (or edited functionality), the NLU model generation system may generate (152) a data structure including the desired NLU functionality.

The data structure may be generated using a data scheme. The data scheme may include portions corresponding to different NLU functionalities. Example NLU functionalities include domain definitions, rules, statistical models, data preparation, slot value mappings, etc. As used herein, "domain definitions" refers to a set of files that (i) define a set of NLU-supported domains, intents, labels, and slots; and (ii) define a conversation from labels hypothesized by NLU to slots that can be ingested by skills. "Slot value mappings" may be many-to-one mappings that define edits to NLU output, with the purpose of making the NLU output cleaner for skills to handle. Slot value mappings may apply to particular labels within a domain/intent pair, such that any string in that domain/intent pair that is hypothesized to have that particular label and exactly matches a pre-defined token value may be converted to a new slot value.

When a developer 5 provides a desired NLU functionality, a representation of the desired NLU functionality may be represented in storage. A developer 5 may provide various desired NLU functionalities. A representation of each desired NLU functionality may be represented in storage. As a result, the data structure, generated from the data scheme, may include a representation of the desired NLU functionality as well as a reference to a storage location where the desired NLU functionality is stored.

Figure 2:
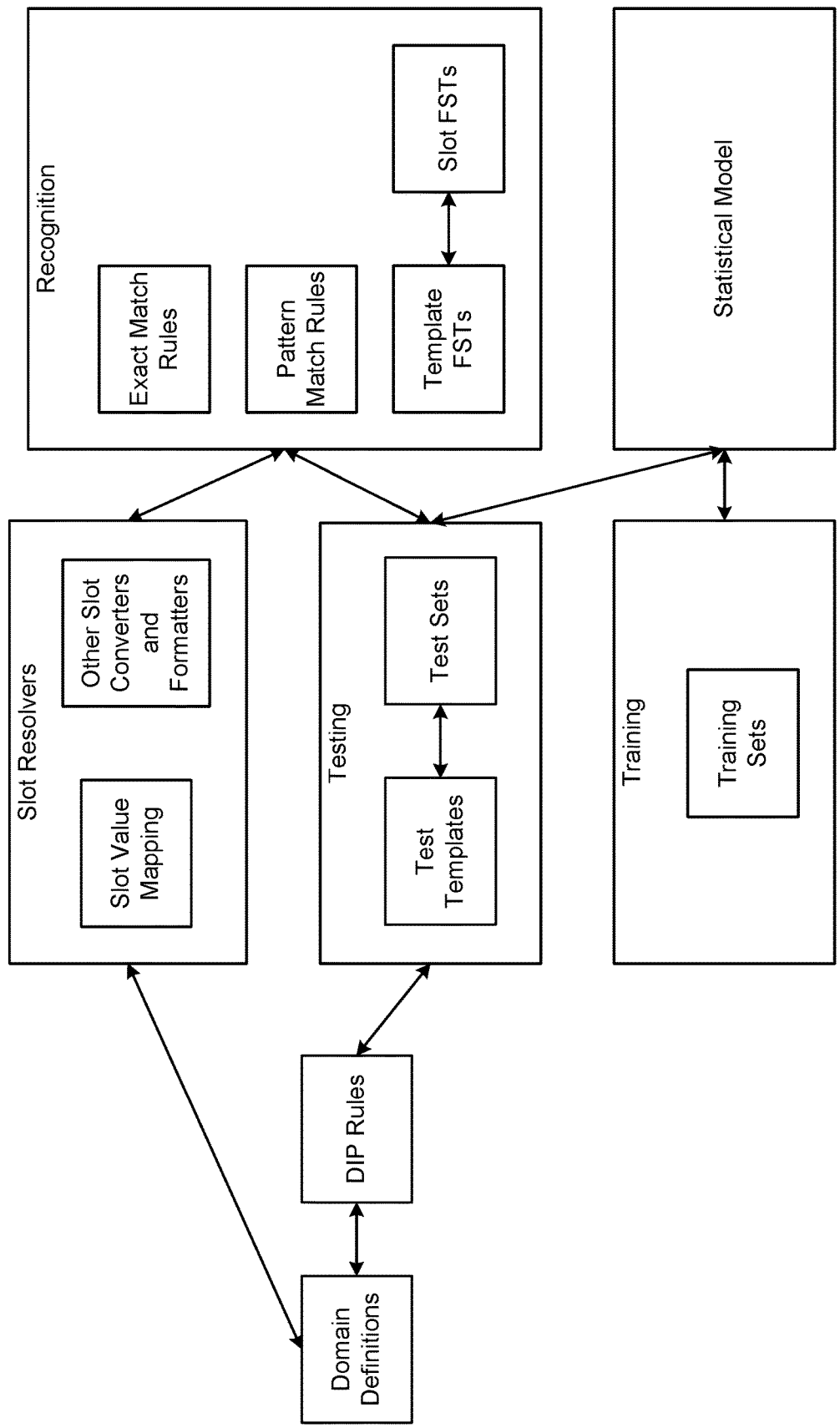
FIG. 2 illustrates an example of dependencies among data structures, in accordance with embodiments of the present disclosure.

Referring back to FIG. 1, after the NLU model generation system generates the data structure, the NLU model generation system may receive (154) data representing a developer input to validate the data structure against other data structures associated with the domain. As illustrated in FIG. 2, components of a data structure may have various dependencies on portions of other data structures of the domain.

"DIP rules," as envisioned by the present disclosure, refers to a series of files of rules that transform developer annotations into NLU standard annotations. For example, DIP rules may correct errors that are known to be common among developers; group a series of similar labels into a single, more general label; etc.

"Exact match rules," as envisioned by the present disclosure, refers to a type of deterministic NLU recognition data that may parse a single possible user input, with no allowance for variations or disfluencies (e.g., "uh," "er," "um," stuttering, false starts, etc.).

"Pattern match rules," as envisioned by the present disclosure, refers to a type of deterministic NLU recognition data that utilize variables and wildcard tokens to parse variants of a particular phrase. Pattern match rules may contain contextual signals.

"Template FSTs," as envisioned by the present disclosure, refers to a type of finite state transducers (FSTs) that define carrier phrases and point to slots (e.g., a carrier phrase may be "play SONG," where SONG is a pointer to a list of song names).

"Slot FSTs," as envisioned by the present disclosure, refers to a type of FST that contains entities that get the same label and are expected to behave similarly in carrier phrases (e.g., "sting," "Madonna," and "the beatles" are all artist names, and may all appear in phrase such as "play music by X"). Slots may be coupled with template FSTs to form "component FSTs."

As illustrated in FIG. 2, domain definitions may be dependent on changes made to slot resolver data, and vice versa. Domains definitions may also be dependent on changes made to DIP rules, and vice versa. DIP rules may be dependent on changes made to testing data, and vice versa. Test templates may be dependent on changes made to test sets, and vice versa. Training data may be dependent on changes made to statistical model data, and vice versa. Testing data may be dependent on changes made to statistical model data, and vice versa. Testing data may also be dependent on changes made to recognition data, and vice versa. Recognition data may be dependent on changes made to slot resolver data, and vice versa. Template FSTs may be dependent on changes made to slot FSTs, and vice versa.

Referring back to FIG. 1, after the NLU model generation system validates the data structure, the NLU model generation system may receive (156) data representing a developer input to release the data structure for production. Thereafter, the NLU model generation system may incorporate (158) the data structure into a runtime NLU model (e.g., corresponding to more than one skill, more than type of device, etc.).

In at least some examples, the NLU model generation system may validate an NLU model component, generated from the data structure, against one or more NLU model components, of an existing NLU model. The one or more existing NLU model components may correspond to one or more different skills. In at least some examples, the NLU model component, generated from the data structure, may only be incorporated into the existing NLU model if the NLU model component does not conflict with existing functionality corresponding to the existing NLU model component(s). For example, the NLU model component, generated from the data structure may be incorporated if such incorporation will not result in error conditions. An example error condition may result from the NLU model component, generated from the data structure, not corresponding to same sample natural language user inputs of an existing NLU model component.

Figure 3A:
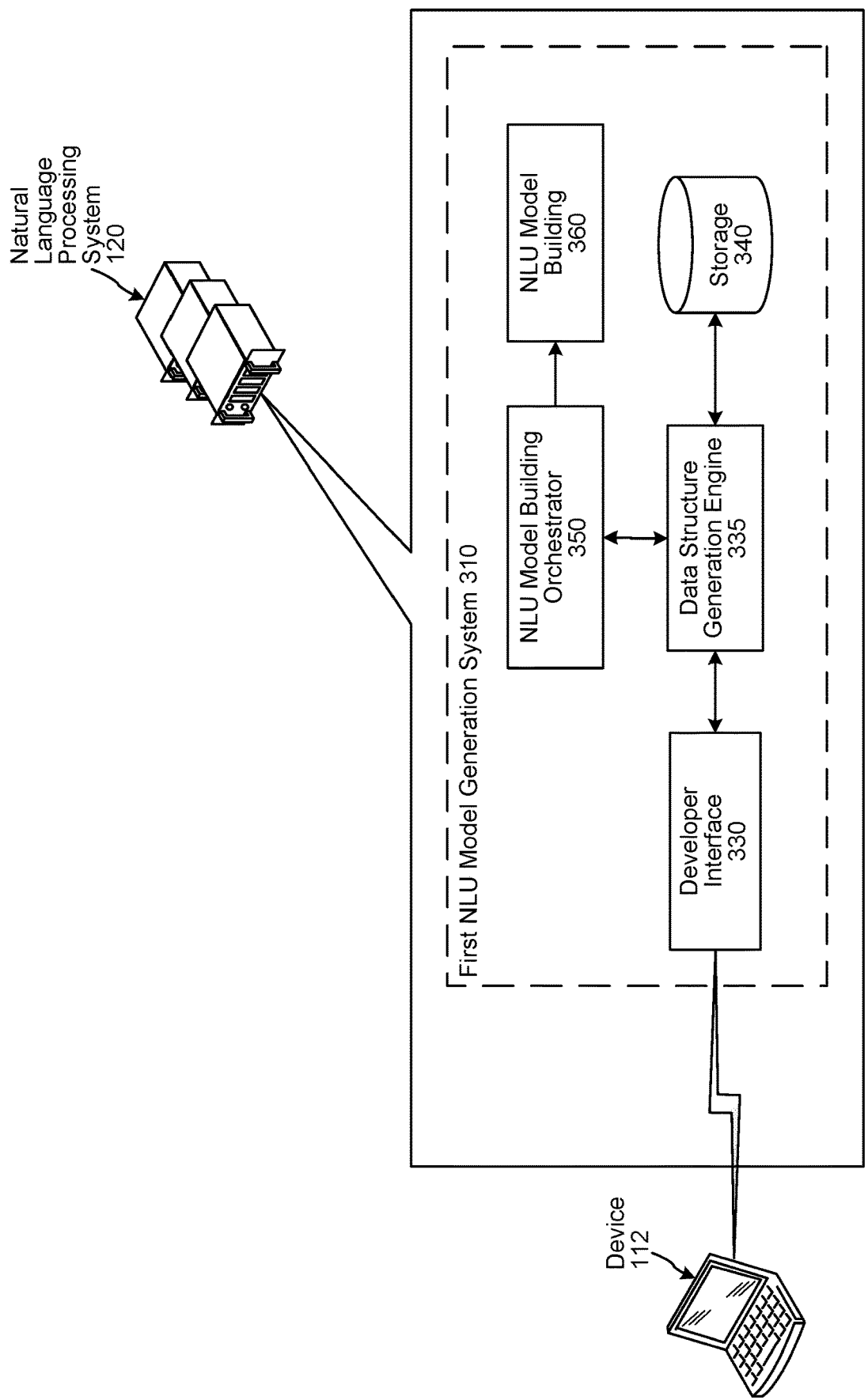
FIG. 3A is a conceptual diagram of how an NLU model generation system may be implemented, in accordance with embodiments of the present disclosure.

FIG. 3A provides an example of how a first NLU model generation system 310 may be implemented. The first NLU model generation system 310 may include a developer interface component 330. The developer interface component 330 may generate a developer interface that is displayable on a display of (or associated with) the device 112. The developer interface may enable the developer 5 to create data representing a desired NLU functionality (e.g., domain definition, exact match rule includes sample user inputs, etc.). The developer interface component 330 may receive data, from the device 112, representing developer inputs received by the device 112 via the developer interface displayed thereby. The developer interface component 330 may send data, received from the device 112, to a data structure generation engine 335.

The data, sent from the developer interface component 330 to the data structure generation engine 335, may a desired NLU functionality. The data structure generation engine 335 may perform various processing to generate a data structure representing the desired NLU functionality.

The data structure generation engine 335 may communicate with one or more endpoints. In at least some examples, desired NLU functionality (e.g., exact match rule sample user inputs, domain definitions, etc.) may be associated with a respective endpoint.

For example, if the data corresponds to one or more natural language sample user inputs for an exact match rule, the data structure generation engine 335 may send the data to a machine translation endpoint component associated with the exact match rule NLU functionality. The machine translation endpoint component may be configured to expand natural language text, representing the one or more natural language sample user inputs, into one or more other natural language representations of the text. Such processing by the machine translation endpoint component may include replacing text with synonyms, adding carrier phrases, and/or other word/phrase level alternations. The foregoing is beneficial because it assists the developer in generating as robust a user input set for an exact match rule as possible, without requiring the developer know every variant of a natural language user input.

For further example, the foregoing machine translation endpoint component (or another endpoint component) may translate natural language text into one or more other languages. For example, if natural language text is in English, the machine translation endpoint component (or other endpoint component) may translate the natural language text into German, Russian, French, Italian, Spanish, etc. Such is beneficial because it enables a developer to generate data in one language, and the system is able to expand the data to other locales (e.g., speaking languages different from the language the developer used).

In another example, the data structure generation engine 335 may communicate with an endpoint component configured to generate finite state transducers (FSTs). As used herein, an "FST" may refer to a data structure that may include grammars representing user inputs as paths that may be traversed during NLU processing. The FST may include data corresponding to many different potential NLU outputs that the system may determine as a result of a particular user input. During runtime the system may use a user input to determine a path through the FST (i.e., traverse the FST) to determine a set of nodes most likely to correspond to the user input. In an example, an FST generation endpoint component may generate an FST representing one or more natural language sample user inputs corresponding to one or more exact match rules.

In an example, the data structure generation engine 335 may communicate with an NLU grammar endpoint component. As used herein, an "NLU grammar" may refer to one or more intent indicators, with each intent indicator being associated with one or more slots. As used herein, a "slot" may refer to an expected portion of a user input corresponding to an intent indicator. The NLU grammar endpoint component may provide, for example, one or more grammars for natural language text associated with an exact match rule. Additionally or alternatively, the NLU grammar endpoint component may validate whether a developer-provided NLU grammar is supported by an runtime NLU component of the natural language processing system 120.

In a further example, the data structure generation engine 335 may communicate with one or more endpoint content providers (e.g., news sources). Each endpoint content provider may provide natural language text, specific to content that may be provided by the endpoint content provider.

In an example, the data structure generation engine 335 may communicate with endpoint components configured to detect when an NLU model, at runtime, is outputting incorrect results. Such an endpoint component may send, to the data structure generation engine 335 (or another component of the first NLU model generation system 310), data representing an NLU functionality is producing incorrect results. In response, the data structure generation engine 335 (or other component of the first NLU model generation system 310) may associate received data (or an indicator thereof) with a user profile indicator associated with the NLU functionality that is malfunctioning. Such may represent, to a corresponding developer, that the data, used to generate the malfunctioning NLU functionality, needs to be altered to generate correct results at runtime.

One skilled in the art will appreciate, from the foregoing, that the data structure generation engine 335 may take data provided by a developer and expand the data (using one or more endpoint devices) to generate a more robust data structure than could be generated from the developer-provided data. The data structure generation engine 235 may send data, received from the developer interface 230 and one or more endpoint devices, to a storage 340.

In at least some examples, the data structure generation engine 235 may be configured with a feedback mechanism that enables the data structure generation engine 235 to consult a second endpoint component when results, generated by a first invoked endpoint component, are inadequate. For example, the data structure generation engine 235 may invoke a first machine translation endpoint component to expand natural language text, representing the one or more natural language sample user inputs, into one or more other natural language representations of the text. The data structure generation engine 235 may determine, using one or more rules, one or more trained models, etc., that the results output by the first machine translation endpoint component are inadequate (e.g., do not include at least a threshold number of natural language representations). As a result, the data structure generation engine 235 may invoke a second machine translation endpoint component. The data structure generation engine 235 may continue this process until the data structure generation engine 235 determines a result of one of the endpoint components, or combined results of the endpoint components (after removing duplicative natural language representations) are adequate (e.g., include at least a threshold number of different natural language representations). The data structure generation engine 335 may perform the foregoing feedback processing with respect to different types of endpoint components.

The data structure generation engine 335 may process an NLU model, generated by the NLU model building component 360 to determine whether the NLU model is an improved model as compared to a previous version of the NLU model, as generated by the NLU model building component 360. As used herein, an "improved model" may be a model that, as compared to a previous version of the model, has a decreased estimated turn error rate, include more natural language sample user inputs, includes more accurate entity labels, has a decreased estimated semantic error rate, considers more data from other domains, is more language agnostic (e.g., is implementable with respect to more languages), would result in more runtime usage, and/or is indicated as better by users of the natural language processing system 120.

The storage 340 may store data corresponding to desired NLU functionality that is to be implemented as part of an NLU model. Different portions of data that may be stored in the storage 340 include NLU schemas, domain definitions, parameters associated with domain definitions, exact match rules, etc. Each portion of data, in the storage 340, may be associated with a unique identifier corresponding to a particular user profile associated with (e.g., stored and implementable by) the first NLU model generation system 310.

In some examples, the developer interface 330 may receive, from the device 112, an indicator representing a developer input to incorporate data, representing desired NLU functionality, into a runtime NLU model (e.g., corresponding to more than one skill, more than one type of device, etc.). The developer interface component 330 may send the indicator the data structure generation engine 335, which may query the storage 340 for data corresponding to the developer's identifier. The data structure generation engine 335 may send the data to an NLU model building orchestrator component 350.

The NLU model building orchestrator component 350 may communicate with an NLU model building component 360 for the purpose of transforming the data, representing the desired NLU functionality, into a portion of a runtime NLU model. The NLU model building orchestrator component 350 may send the data, to be transformed, to the NLU model building component 360.

The NLU model building component 360 may test received data to ensure the data is compliant with various requirements of properly generating an NLU model. For example, the NLU model building component 360 may ensure data is in the proper case (e.g., exact match rules may require data be in all capital letters). Various other testing is also possible.

After testing the data and determining the data is compliant with all applicable requirements, the NLU model building component 360 may generate a component of an NLU model from the data. In at least some examples, the generated component of the NLU model may be a compressed file containing text corresponding to desired NLU functionality defined by the developer. The component of the NLU model may be sent to an NLU component 760, of the natural language processing system 120, for use at runtime. For example, the component may be incorporated into an existing NLU model associated with multiple different skills.

Figure 3B:
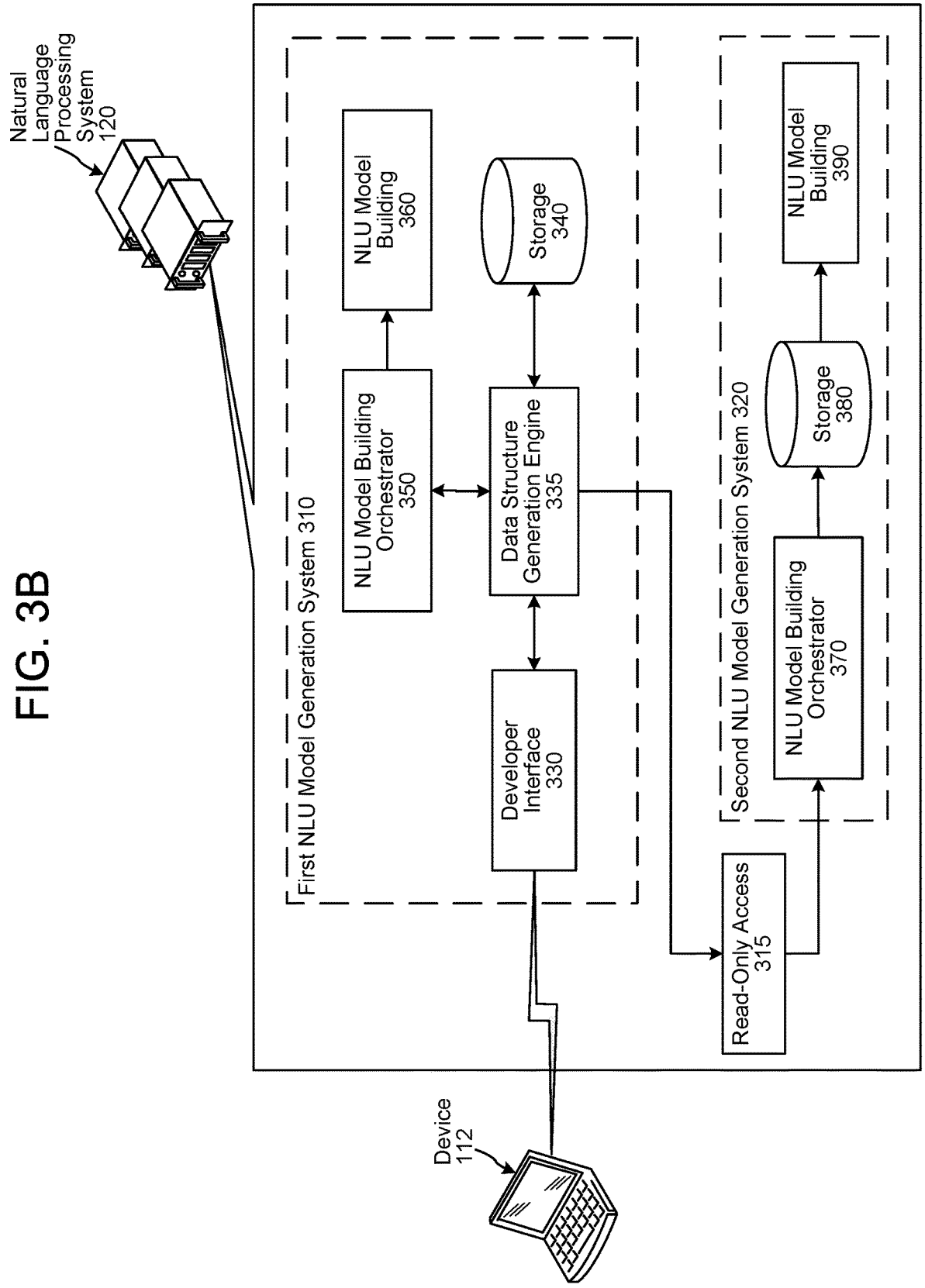
FIG. 3B is a conceptual diagram of how the two NLU model generation systems may be simultaneously implemented, in accordance with embodiments of the present disclosure.

At least some natural language processing systems may implement an NLU model generation system prior to implementing the first NLU model generation system 310. It may be desired to transition NLU model generation from the existing NLU model generation system to the first NLU model generation system 310. FIG. 3B illustrates an example in which the first NLU model generation system 310 is implemented at the same time as a second NLU model generation system 320.

When or after the data structure generation engine 335 sends the data to the NLU model building orchestrator component 350, the data structure generation engine 335 may send the data to the second NLU model generation system 320 (and more particularly an NLU model building orchestrator component 370 implemented by the second NLU model generation system 320). In at least some examples, to limit potential security breaches, it may be desirable to limit the data structure generation engine 335's access, to the second NLU model generation system 320, to read-only access. In such examples, the data structure generation engine 335 may send the data to a read-only access component 315, where the data may remain until the developer logs in to the second NLU model generation system 320 and indicates the NLU model building orchestrator component 370 should pull the data from the read-only access component 315.

In another example, the data structure generation engine 335 may send, to the read-only access component 315, location information representing where the data, associated with the user profile identifier, is located in the storage 340. In response to the second NLU model generation system 320 receiving the foregoing indicator from the developer, the NLU model building orchestrator component 370 may request and receive, from the read-only access component 315, the location information. The NLU model building orchestrator component 370 may thereafter, using the location information, receive the data from the storage 340, and thereafter cause the data to be stored in the storage 380.

After the data is stored in the storage 380, the data may be sent to an NLU model building component 390 implemented by the second NLU model generation system 320. The NLU model building component 390 may, in at least some examples, not be configured to test received data to ensure the data is compliant with various requirements of properly generating an NLU model. This may be premised on the configuration of the second NLU model generation system 320, which requires the developer understand parameters that files have, ramifications of making changes to parameters, downstream effects of making such changes, etc. In other words, the NLU model building component 390 may assume the data it receives is already compliant with applicable requirements.

The NLU model building component 390 may generate a component of an NLU model from the data. In at least some examples, the generated component of the NLU model may be a compressed file containing text corresponding to desired NLU functionality defined by the developer.

The NLU model building pipelines of the NLU model building component 360 and the NLU model building component 390 may be different. However, since the system may ultimately disable the NLU models of the second NLU model generation system 320 (and optionally may disable the second NLU model generation system 320 itself), it may be beneficial for the component of the NLU model, generated by the NLU model building component 360, to be substantially similar (if not identical) to the component of the NLU model generated by the NLU model building component 360. In other words, it may be beneficial for functionality performed by the component of the NLU model, generated by the NLU model building component 360, to be substantially similar (if not identical) to the functionality performed by the component of the NLU model generated by the NLU model building component 360.

FIGS. 4A through 4C illustrate example processing of the first NLU model generation system 310 when a developer wants to generate or alter data that may be used to generate an NLU model. The processes illustrated in and described with respect to FIGS. 4A through 4C may be performed while the NLU models of the second NLU model generation system 320 are implemented, or after the NLU models of the second NLU model generation system 320 have been disabled.

The device 112 may display (402) a developer interface for the first NLU model generation system 310 (e.g., an interface generated by the developer interface component 330). In at least some examples, the developer interface may be a web-based developer interface. The device 112 may receive (404) developer login credential associated with a user profile stored by the first NLU model generation system 310. The device 112 may send (406) data, representing the developer login credentials, to the developer interface component 330, which may send (407) the data to the data structure generation engine 335.

The data structure generation engine 335 may determine (408) a user profile identifier associated with the developer login credentials. Thereafter, the data structure generation engine 335 may send (410), to the NLU model building orchestrator component 350, a request for data identifiers associated with the user profile identifier. The data structure generation engine 335 may receive (412), from the NLU model building orchestrator component 350, data identifiers associated with the user profile identifier. The data structure generation engine 335 may thereafter send (414), to the NLU model building orchestrator component 350, a request for API (application program interface) calls for the received data identifiers. The API calls may correspond to calls to be used by the developer interface component 330 to retrieve data, corresponding to the data identifiers, from the storage 340.

The data structure generation engine 335 may thereafter receive (416), from the NLU model building orchestrator component 350, API calls for the data identifiers. Each API call may be associated with a different data identifier. Each data identifier may correspond to a different desired NLU functionality, defined by the developer, stored in the storage 340. By receiving such API calls, the data structure generation engine 335 is able to retrieve and store desired NLU functionalities, individually. This, in turn, enables a developer to generate or alter desired NLU functionalities, individually. Moreover, such enables the data structure generation engine 335 to version desired NLU functionalities, individually. This is beneficial because it enables a developer to customize individual desired NLU functionalities without needing to understand how customization of one desired NLU functionality may affect another desired NLU functionality.

The data structure generation engine 335 may request (418), from the storage 340, data associated with the API calls. The storage 340 may store data representing desired NLU functionalities that are to be transformed into components of NLU models and that are associated with different user profile identifiers. Each user profile identifier may be associated with different data representing one or more desired NLU functionalities to be transformed into a component of an NLU model. By requesting data associated with the individual API calls, specific to the user profile identifier corresponding to the received developer login credentials, the data structure generation engine 335 is able to receive (420), from the storage 340, data (representing desired NLU functionalities) associated with the developer login credentials. The received data may correspond to a versioned history unique to the user profile identifier. This enables a developer to easily walk back to prior versions of the developer's data (e.g., prior versions of the desired NLU functionalities). The data structure generation engine 335 may send (422) the data to the developer interface component 330, which may send (423) the data to the device 112.

The data, the data structure generation engine 335 receives from the storage 340, may correspond to one or more different desired NLU functionalities that may be transformed into a component of an NLU model. For example, the received data may correspond to exact match rules, domain definitions, pattern match rules, intent indicators, slot indicators, statistical model training data, etc.

The device 112 may display (424) the data received from the developer interface component 330. The developer interface may be configured such that the developer 5 may define a new desired NLU functionality, or alter a particular existing desired NLU functionality, independently from other displayed desired NLU functionalities.

The device 112 may receive (426) a developer input to define a new desired NLU functionality, or alter an existing desired NLU functionality presented on the developer interface. The device 112 may send (428), to the developer interface component 330, data representing the developer input. The developer interface component 330 may send (429) the received data to the data structure generation engine 335.

The data structure generation engine 335 may validate (430) the received data against data configuration requirements necessary for data to be usable to generate a component of an NLU model. For example, the data structure generation engine 335 may perform syntax validation on a desired NLU functionality level (e.g., each type of desired NLU functionality may be associated with different syntax requirements). For example, the data structure generation engine 335 may validate that the received data is in a proper font effect (e.g., all capital letters). The data structure generation engine 335 may also or alternatively enforce restrictions. For example, the data structure generation engine 335 may determine subscribed-to system functionalities associated with the user profile identifier, and determine whether the received data corresponds to at least one of the subscribed-to system functionalities. If the received data does not correspond to at least one of the subscribed-to system functionalities, the data structure generation engine 335 may cause the device 112 to indicate to the developer that the generated or modified desired NLU functionality needs to be altered. Various other types of validation are possible.

After the data structure generation engine 335 validates the data, the data structure generation engine 335 may send (432) the validated data to the storage 240. The data structure generation engine 335 may also, in some examples, send the user profile identifier to the storage 340, so the validated data can be associated with the user profile identifier in the storage 340. The data structure generation engine 335 receives (434), from the storage 340, an API call for the stored validated data.

The data structure generation engine 335 may send (436), to the NLU model building orchestrator component 350, an instruction to store an association between the API call, for the validated data, and the user profile identifier, determined at step 408. Thereafter, the data structure generation engine 335 may receive (438), from the NLU model building orchestrator component 350, a validated data identifier representing the validated data. The validated data identifier, received by the data structure generation engine 335, may be associated with the API call and the user profile identifier in a storage (not illustrated) associated with the NLU model building orchestrator component 350.

After receiving the validated data identifier, the data structure generation engine 335 may send (440), to the developer interface component 330, an indicator representing generated or modified data (representing an newly defined or altered desired NLU functionality), received at step 428, has been stored. The developer interface component 330 may send (441) the indicator to the device 112. The device 112 may display (442) the indicator (or a derivative thereof) on the developer interface.

After a developer logs in to the first NLU model generation system 310, the developer may query the first NLU model generation system 310 for a list of, and optionally statuses of, current processes being performed with respect to the developer's user profile (as illustrated in FIG. 5). Such processes include, but are not limited to, building a component of an NLU model, training a statistical model, building a grammar for a component of an NLU model, testing a component of an NLU model, etc. Each process may be performed with respect to one, or more than one, specific type of desired NLU functionality (discussed herein above) presented via the developer interface. In at least some examples, a process may be performed with respect to only a subset of the types of desired NLU functionalities presented via the developer interface.

The device 112 may display (402) the developer interface generated by the developer interface component 330. The device 112 may receive (502) a request for (e.g., a developer input requesting) a list of current processes being performed with respect to the developer's user profile identifier (and optionally present statuses of those processes). The device 112 may send (504), to the developer interface component 330, data representing the request. The developer interface component 330 may send (505) the data to the data structure generation engine 335.

The data structure generation engine 335 may send (7506), to the NLU model building orchestrator component 350, a request for process identifiers representing presently ongoing processes associated with the user profile identifier. In return, the data structure generation engine 335 may receive (508), from the NLU model building orchestrator component 350, the requested process identifiers. The data structure generation engine 335 may also receive, for each process identifier, a status of the corresponding process. The data structure generation engine 335 may send (510), to the developer interface component 330, the process identifiers (and statuses in at least some situations). The developer interface component 330 may send (511) the process identifiers (and statuses in at least some situations) to the device 112. The device 112 may display (512) the process identifiers (and statuses if appropriate) via the developer interface.

After a developer logs in to the second NLU model generation system, the developer may cause a new process to be commenced (as illustrated in FIG. 6). Such processes include, but are not limited to, building a component of an NLU model, training a statistical model, building a grammar for a component of an NLU model, testing a component of an NLU model, etc.

The device 112 may display (402) the developer interface generated by the developer interface component 330. The device 112 may receive (602) a developer input to start a new process with respect to one or more particular types of desired NLU functionality (discussed herein above) displayed on the developer interface. The device 112 may send (604), to the developer interface component 330, data representing the developer input. The developer interface component 330 may send (605) the data to the data structure generation engine 335.

The data structure generation engine 335 may send (7606), to the NLU model building orchestrator component 350, a request for a new process, corresponding to the developer input, to be started. The NLU model building orchestrator component 350 may cause the new process to be started and associate the new process with a process identifier, which the NLU model building orchestrator component 350 may send (608) to the data structure generation engine 335. The data structure generation engine 335 may send (610), to the developer interface component 330, the process identifier associated with the newly commenced process. The developer interface component 330 may send (611) the indicator to the device 112, which may display (612) the process identifier via the developer interface.

Figure 7:
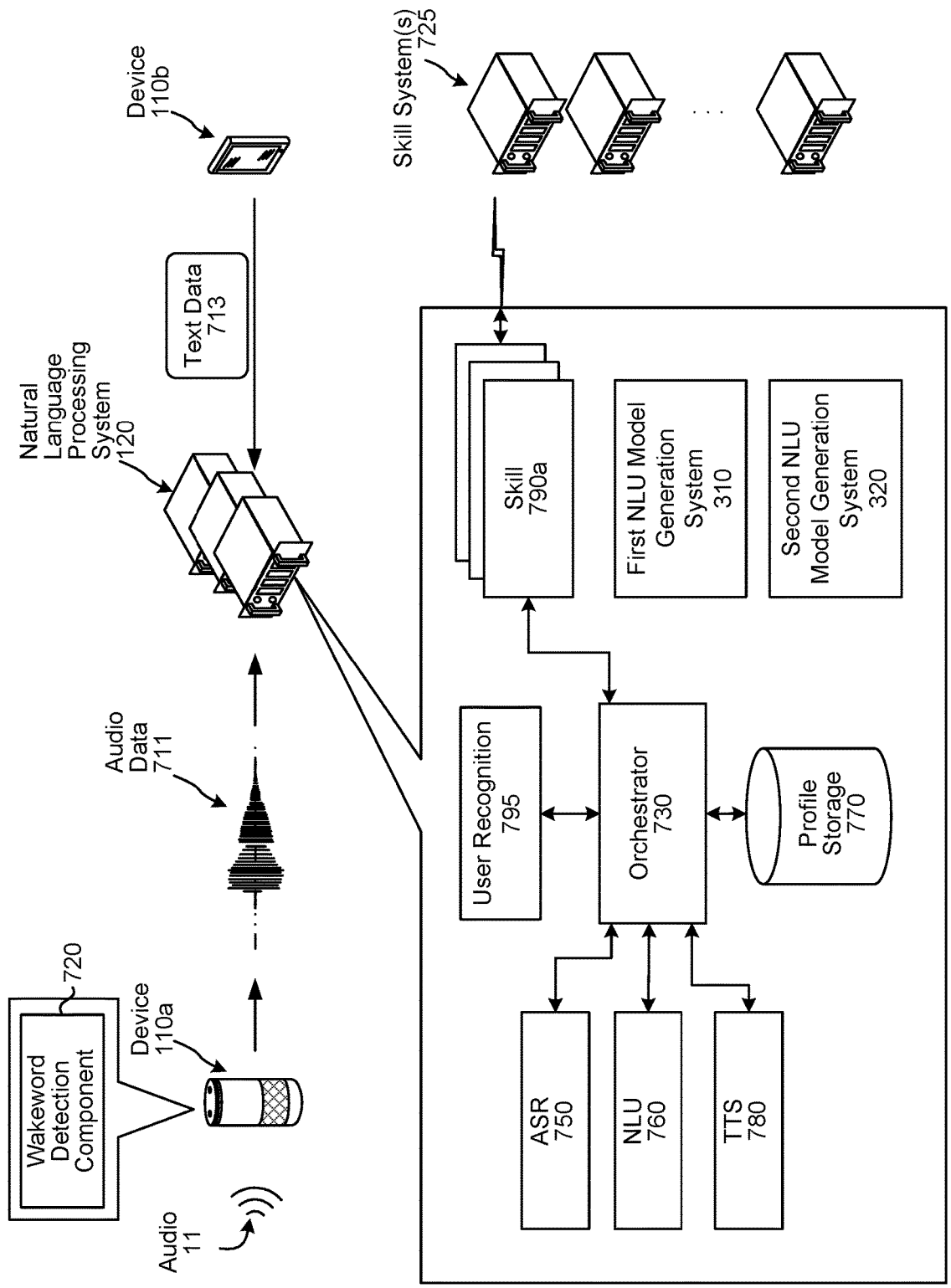
FIG. 7 is a conceptual diagram of components of a system, in accordance with embodiments of the present disclosure.

FIG. 7 illustrates various runtime components of the natural language processing system 120. Communication between various components may occur directly or across a network(s) 199.

An audio capture component(s), such as a microphone or array of microphones of the device 110*a*, captures audio 11. The device 110*a* processes audio data, representing the audio 11, to determine whether speech is detected. The device 110*a* may use various techniques to determine whether audio data includes speech. In some examples, the device 110*a* may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110*a* may implement a limited classifier configured to distinguish speech from background noise. The classifier may be implemented by techniques such as linear classifiers, support vector machines, and decision trees. In still other examples, the device 110*a* may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110*a* may use a wakeword detection component 720 to perform wakeword detection to determine when a user intends to speak an input to the natural language processing system 120. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 720 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 720 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110*a* may "wake" and begin transmitting audio data 711, representing the audio 11, to the natural language processing system 120. The audio data 711 may include data corresponding to the wakeword, or the device 110*a* may remove the portion of the audio corresponding to the wakeword prior to sending the audio data 711 to the natural language processing system 120.

An orchestrator component 730 may receive the audio data 711. The orchestrator component 730 may include memory and logic that enables the orchestrator component 730 to transmit various pieces and forms of data to various components of the system, as well as perform other operations.

The orchestrator component 730 sends the audio data 711 to an ASR component 750. The ASR component 750 transcribes the audio data 711 into text data. The text data output by the ASR component 750 represents one or more than one (e.g., in the form of an n-best list) ASR hypotheses representing speech represented in the audio data 711. The ASR component 750 interprets the speech in the audio data 711 based on a similarity between the audio data 711 and pre-established language models. For example, the ASR component 750 may compare the audio data 711 with models for sounds (e.g., subword units, such as phonemes, etc.) and sequences of sounds to identify words that match the sequence of sounds of the speech represented in the audio data 711. The ASR component 750 outputs text data representing one or more ASR hypotheses. The text data output by the ASR component 750 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110*b* may receive a text-based user input. The device 110*b* may generate text data 713 representing the text-based user input. The device 110*a* may send the text data 713 to the natural language processing system 120. The orchestrator component 730 may receive the text data 713.

The orchestrator component 730 may send text data (e.g., text data output by the ASR component 750 or the received text data 713) to an NLU component 760.

The NLU component 760, implementing NLU models, attempts to make a semantic interpretation of the phrase(s)

or statement(s) represented in the received text data. That is, the NLU component 760 determines one or more meanings associated with the phrase(s) or statement(s) represented in the text data based on words represented in the text data. The NLU component 760 determines an intent representing an action that a user desires be performed as well as pieces of the text data that allow a device (e.g., the device 110, the natural language processing system 120, a skill 790, a skill system(s) 725, etc.) to execute the intent. For example, if the text data corresponds to "play Adele music," the NLU component 760 may determine an intent that the natural language processing system 120 output music and may identify "Adele" as an artist. For further example, if the text data corresponds to "what is the weather," the NLU component 760 may determine an intent that the natural language processing system 120 output weather information associated with a geographic location of the device 110. In another example, if the text data corresponds to "turn off the lights," the NLU component 760 may determine an intent that the natural language processing system 120 turn off lights associated with the device(s) 110 or the user(s) 5. The NLU component 760 may output NLU results data (which may include tagged text data, indicators of intent, etc.).

As described above, the natural language processing system 120 may perform speech processing using two different components (e.g., the ASR component 750 and the NLU component 760). One skilled in the art will appreciate that the natural language processing system 120, in at least some implementations, may implement a spoken language understanding (SLU) component that is configured to process audio data 711 to generate NLU results data. In such an implementation, the SLU component may implement the herein described NLU models.

In some examples, the SLU component may be equivalent to the ASR component 750 and the NLU component 760. For example, the SLU component may process audio data 711 and generate NLU data. The NLU data may include intent data and/or slot data so that directives may be determined based on the intent data and/or the slot data. While the SLU component may be equivalent to a combination of the ASR component 750 and the NLU component 760, the SLU component may process audio data 711 and directly generate the NLU data, without an intermediate step of generating text data (as does the ASR component 750). As such, the SLU component may take audio data 711 representing speech and attempt to make a semantic interpretation of the speech. That is, the SLU component may determine a meaning associated with the speech and then implement that meaning. For example, the SLU component may interpret audio data 711 representing speech from the user 5 in order to derive an intent or a desired action or operation from the user 5. In some examples, the SLU component outputs a most likely NLU response (e.g., hypothesis) recognized in the audio data 711, or multiple hypotheses in the form of a lattice or an N-best list with individual hypotheses corresponding to confidence scores or other scores (such as probability scores, etc.).

The natural language processing system 120 may include one or more skills 790. A "skill" may be software running on the natural language processing system 120 that is akin to a software application running on a traditional computing device. That is, a skill 790 may enable the natural language processing system 120 to execute specific functionality in order to provide data or produce some other requested output. The natural language processing system 120 may be configured with more than one skill 790. For example, a weather service skill may enable the natural language processing system 120 to provide weather information, a car service skill may enable the natural language processing system 120 to book a trip with respect to a taxi or ride sharing service, a restaurant skill may enable the natural language processing system 120 to order a pizza with respect to the restaurant's online ordering system, etc. A skill 790 may operate in conjunction between the natural language processing system 120 and other devices, such as the device 110, in order to complete certain functions. Inputs to a skill 790 may come from speech processing interactions or through other interactions or input sources. A skill 790 may include hardware, software, firmware, or the like that may be dedicated to a particular skill 790 or shared among different skills 790.

In addition or alternatively to being implemented by the natural language processing system 120, a skill 790 may be implemented by a skill system(s) 725. Such may enable a skill system(s) 725 to execute specific functionality in order to provide data or perform some other action requested by a user.

Skills may be associated with different domains, such as smart home, music, video, flash briefing, shopping, and custom (e.g., skills not associated with any pre-configured domain).

The natural language processing system 120 may be configured with a single skill 790 dedicated to interacting with more than one skill system(s) 725.

Unless expressly stated otherwise, reference herein to a "skill," or a derivative thereof, may include a skill 790 operated by the natural language processing system 120 and/or skill operated by a skill system(s) 725. Moreover, the functionality described herein as a skill may be referred to using many different terms, such as an action, bot, app, or the like.

The natural language processing system 120 may include a TTS component 780. The TTS component 780 may generate audio data (e.g., synthesized speech) from text data using one or more different methods. Text data input to the TTS component 780 may come from a skill 790, the orchestrator component 730, or another component of the natural language processing system 120.

In one method of synthesis called unit selection, the TTS component 780 matches text data against a database of recorded speech. The TTS component 780 selects matching units of recorded speech and concatenates the units together to form audio data. In another method of synthesis called parametric synthesis, the TTS component 780 varies parameters such as frequency, volume, and noise to create audio data including an artificial speech waveform. Parametric synthesis uses a computerized voice generator, sometimes called a vocoder.

The natural language processing system 120 may include a user recognition component 795 that recognizes one or more users associated with data input to the natural language processing system 120. The user recognition component 795 may take as input the audio data 711 and/or the text data 713. The user recognition component 795 may perform user recognition by comparing speech characteristics in the audio data 711 to stored speech characteristics of users. The user recognition component 795 may additionally or alternatively perform user recognition by comparing biometric data (e.g., fingerprint data, iris data, etc.), received by the natural language processing system 120 in correlation with a user input, to stored biometric data of users. The user recognition component 795 may additionally or alternatively perform user recognition by comparing image data (e.g., including a representation of at least a feature of a user), received by the natural language processing system 120 in correlation with a user input, with stored image data including representations of features of different users. The user recognition component 795 may perform other or additional user recognition processes, including those known in the art. For a particular user input, the user recognition component 795 may perform processing with respect to stored data of users associated with the device 110 that captured the user input.

The user recognition component 795 determines whether a user input originated from a particular user. For example, the user recognition component 795 may generate a first value representing a likelihood that a user input originated from a first user, a second value representing a likelihood that the user input originated from a second user, etc. The user recognition component 795 may also determine an overall confidence regarding the accuracy of user recognition operations.

The user recognition component 795 may output a single user identifier corresponding to the most likely user that originated the user input. Alternatively, the user recognition component 795 may output multiple user identifiers (e.g., in the form of an N-best list) with respective values representing likelihoods of respective users originating the user input. The output of the user recognition component 795 may be used to inform NLU processing, processing performed by a skill 790, as well as processing performed by other components of the natural language processing system 120 and/or other systems.

The natural language processing system 120 may include profile storage 770. The profile storage 770 may include a variety of information related to individual users, groups of users, devices, etc. that interact with the natural language processing system 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 770 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the natural language processing system 120 with permission to allow the skill to execute with respect to the user's inputs. If a user does not enable a skill, the natural language processing system 120 may not permit the skill to execute with respect to the user's inputs.

The profile storage 770 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 770 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 8:
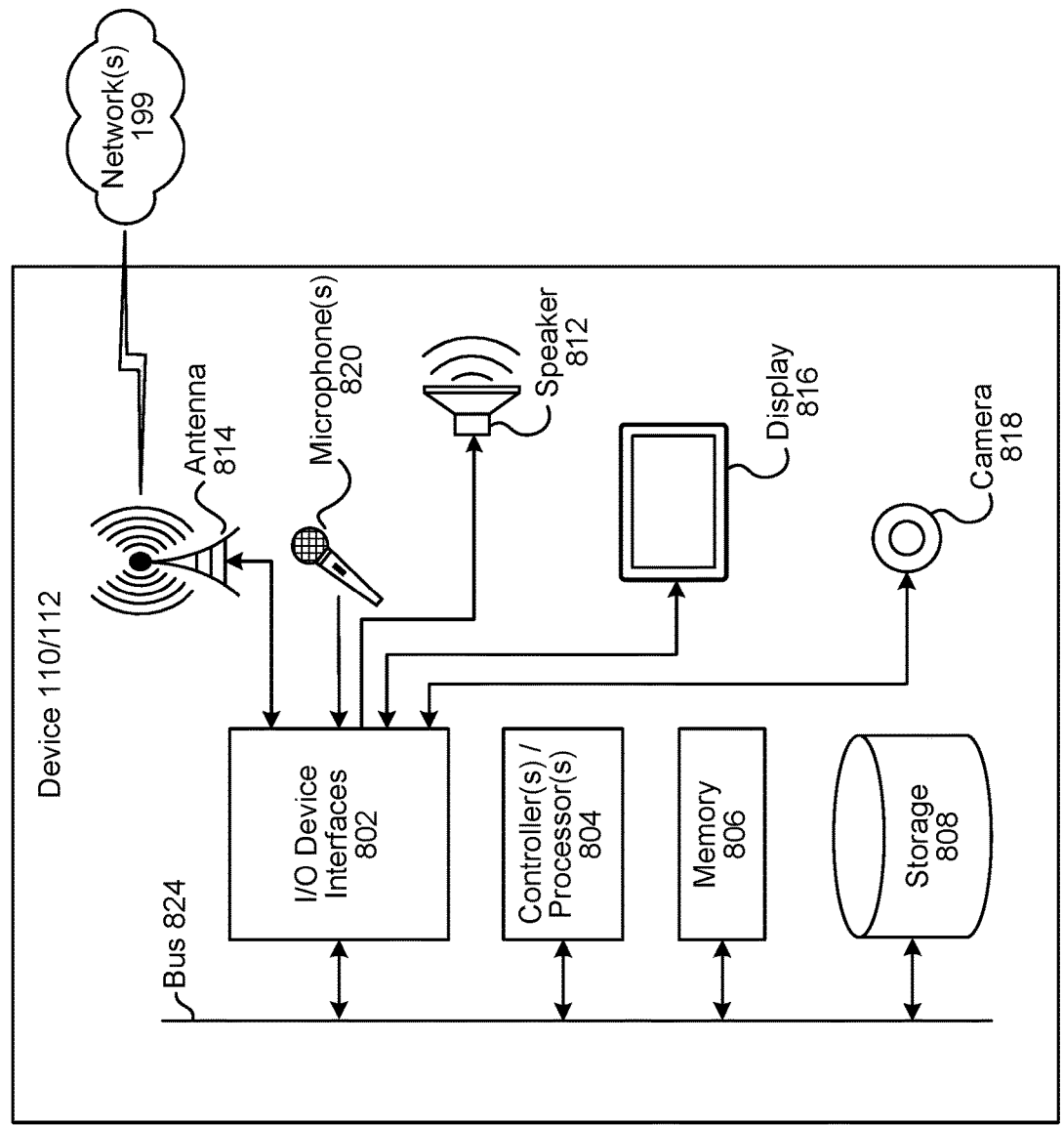
FIG. 8 is a block diagram conceptually illustrating example components of a device, in accordance with embodiments of the present disclosure.
Figure 9:
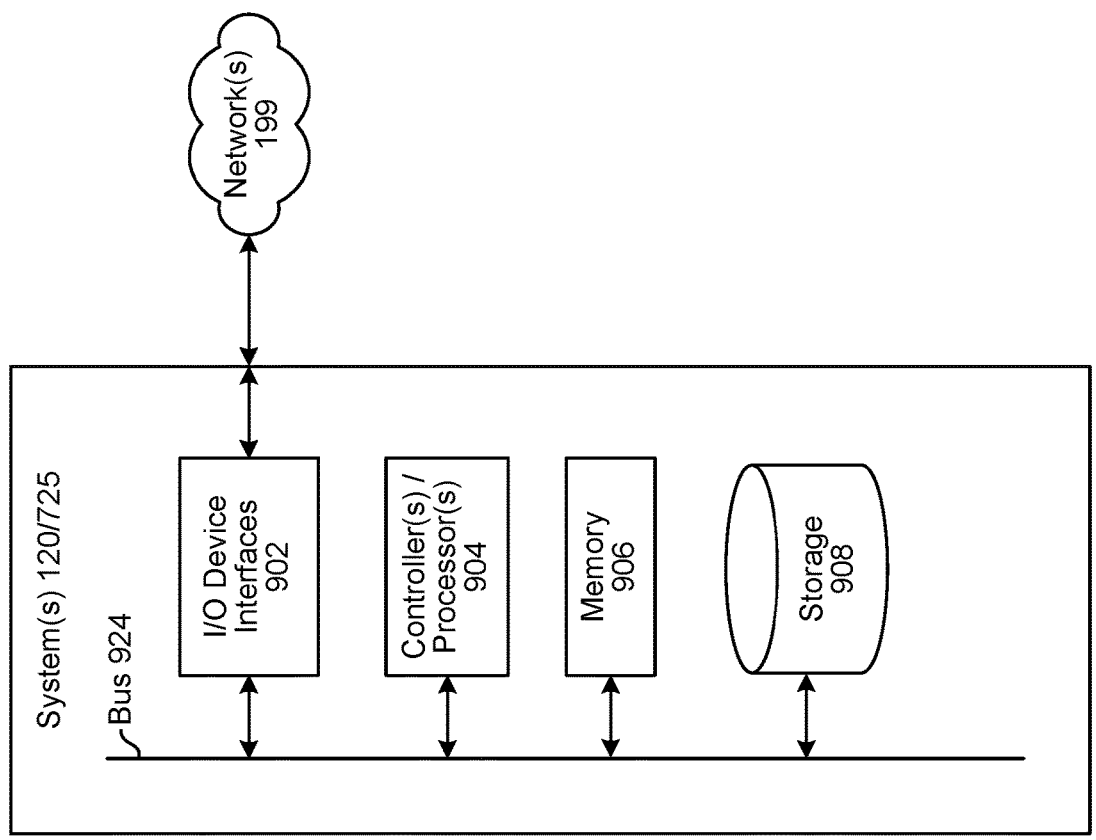
FIG. 9 is a block diagram conceptually illustrating example components of a system, in accordance with embodiments of the present disclosure.

FIG. 8 is a block diagram conceptually illustrating a device 110/112 that may be used with the system. FIG. 9 is a block diagram conceptually illustrating example components of a remote device, such as the natural language processing system 120, which may assist with ASR processing, NLU processing, etc., and the skill system(s) 725. A system (120/725) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/725) may be included in the overall system 100 of the present disclosure, such as one or more natural language processing systems 120 for performing ASR processing, one or more natural language processing systems 120 for performing NLU processing, one or more skill system(s) 725, etc. In operation, each of these systems may include computer-readable and computer-executable instructions that reside on the respective device (120/725), as will be discussed further below.

Each of these devices (110/112/120/725) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/112/120/725) may also include a data storage component (808/908) for storing data and controller/processor-executable instructions. Each data storage component (808/908) may individually include one or more non-volatile storage types such as magnetic storage, optical storage, solid-state storage, etc. Each device (110/112/120/725) may also be connected to removable or external non-volatile memory and/or storage (such as a removable memory card, memory key drive, networked storage, etc.) through respective input/output device interfaces (802/902).

Computer instructions for operating each device (110/112/120/725) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/112/120/725) includes input/output device interfaces (802/902). A variety of components may be connected through the input/output device interfaces (802/902), as will be discussed further below. Additionally, each device (110/112/120/725) may include an address/data bus (824/924) for conveying data among components of the respective device. Each component within a device (110/112/120/725) may also be directly connected to other components in addition to (or instead of) being connected to other components across the bus (824/924).

Referring to FIG. 8, the device 110/112 may include input/output device interfaces 802 that connect to a variety of components such as an audio output component such as a speaker 812, a wired headset or a wireless headset (not illustrated), or other component capable of outputting audio. The device 110/112 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110/112 may additionally include a display 816 for displaying content. The device 110/112 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110/112, the natural language processing system 120, or the skill system(s) 725 may include their own dedicated processors, memory, and/or storage. Alternatively, one or more of the components of the device(s) 110/112, the natural language processing system 120, or the skill system(s) 725 may utilize the I/O interfaces (802/902), processor(s) (804/904), memory (806/906), and/or storage (808/908) of the device(s) 110/112 natural language processing system 120, or the skill system(s) 725, respectively. Thus, the ASR component 750 may have its own I/O interface(s), processor(s), memory, and/or storage; the NLU component 760 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110/112, the natural language processing system 120, and the skill system(s) 725, as described herein, are illustrative, and may be located as a stand-alone device or may be included, in whole or in part, as a component of a larger device or system.

Figure 10:
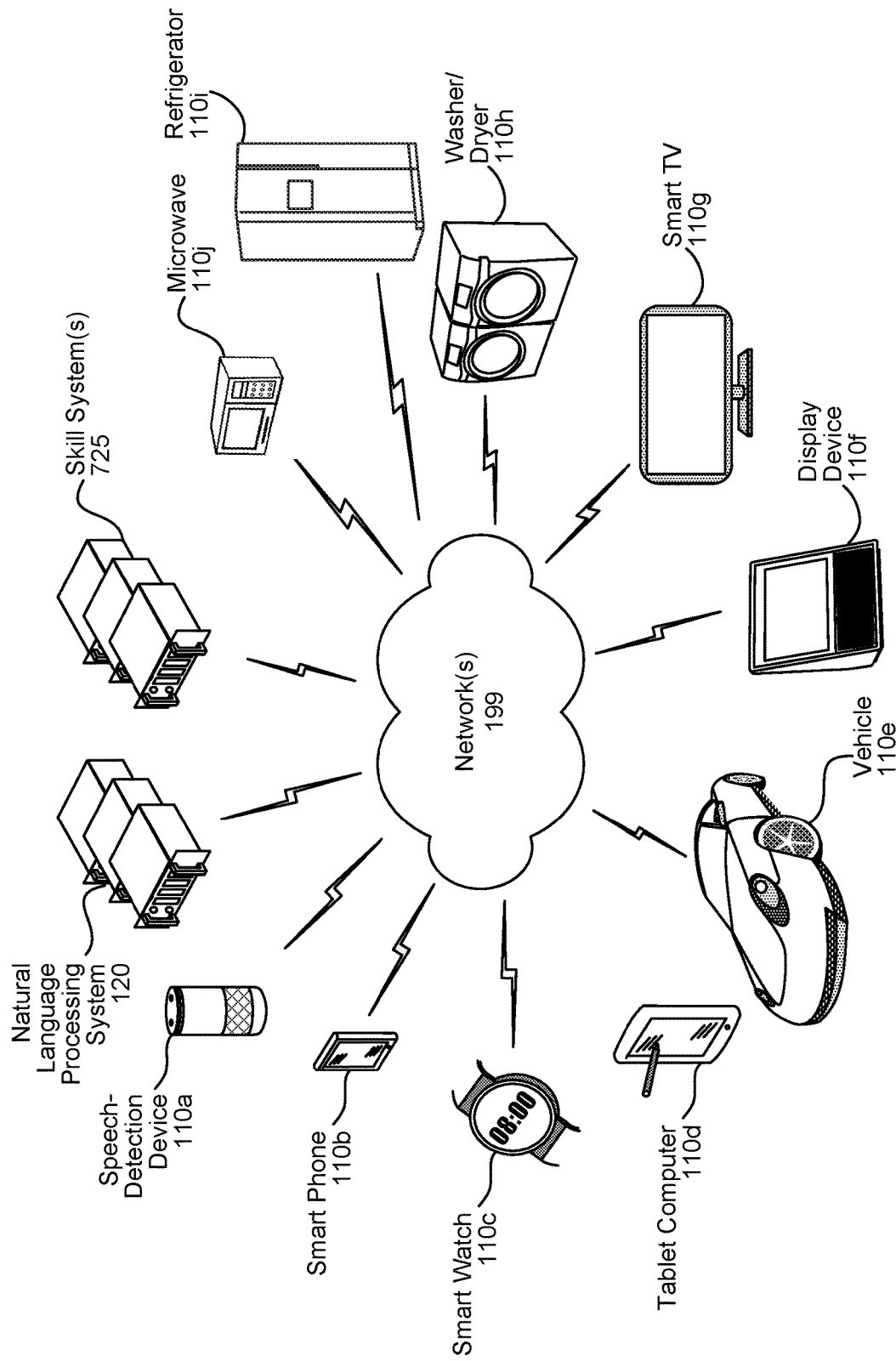
FIG. 10 illustrates an example of a computer network for use with the overall system, in accordance with embodiments of the present disclosure.

As illustrated in FIG. 10, multiple devices (110a-110j, 120, 725) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the natural language processing system 120, the skill system(s) 725, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 750, the NLU component 760, etc. of the natural language processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
receiving, from a developer device, first data representing a runtime natural language understanding (NLU) functionality corresponding to a first skill;
determining the first data includes a first sample user input representing a first natural language utterance used to invoke the first skill;
determining a second sample user input representing a second natural language utterance used to invoke the first skill, the second sample user input corresponding to a natural language variant of the first sample user input;
generating a data structure representing the runtime NLU functionality, the data structure including a storage location identifier corresponding to the first and second sample user inputs;
receiving, from the developer device, second data indicating the data structure is to be released for production;
using the data structure, generating a first NLU model portion, wherein the generating uses the first and second sample user inputs;
identifying an NLU model operable with respect to a plurality of skills, the plurality of skills including the first skill and at least a second skill; and
generating, using the NLU model, an updated NLU model including the first NLU model portion, wherein the updated NLU model is operable with respect to the plurality of skills.

2. The method of claim 1, further comprising:
identifying, in the NLU model, a second NLU model portion corresponding to the second skill;
determining a third sample user input corresponding to the second NLU model portion;
determining the first and second sample user inputs are different from the third sample user input; and
after determining the first and second sample user inputs are different from the third sample user input, including, in the updated NLU model, the second NLU model portion.

3. The method of claim 1, wherein the first sample user input corresponds to a first language and wherein the method further comprises:
sending the first sample user input to a machine translation component; and
receiving, from the machine translation component, a third sample user input representing a third natural language utterance, the third sample user input corresponding to the first sample user input but in a second language,
wherein the storage location identifier further corresponds to the third sample user input.

4. The method of claim 1, further comprising:
sending the first and second sample user inputs to a finite state transducer (FST) component; and
receiving, from the FST component, FST data corresponding to the first and second sample user inputs,
wherein the data structure further include a second storage location identifier corresponding to the FST data.

5. A system, comprising:
at least one processor; and
at least one memory including instructions that, when executed by the at least one processor, cause the system to:
receive, from a developer device, first data representing a runtime natural language understanding (NLU) functionality;
generate a data structure representing the runtime NLU functionality, the data structure including a storage location identifier corresponding to the first data;
receive, from the developer device, second data indicating the data structure is to be incorporated into an NLU model for runtime operation;
use the data structure to generate a NLU model portion; and
generate, using the NLU model, an updated NLU model including the NLU model portion.

6. The system of claim 5, wherein the at least one memory further includes instructions that, when executed by the at least one processor, further cause the system to:
determine the first data includes a first sample user input representing a first natural language utterance used to invoke a first skill; and
determine a second sample user input representing a second natural language utterance used to invoke the first skill, the second sample user input corresponding to a natural language variant of the first sample user input,
wherein the storage location identifier further corresponds to the second sample user input.

7. The system of claim 6, wherein:
the first sample user input corresponds to a first language; and
the second sample natural language user input corresponds to the first sample natural language user input but in a second language.

8. The system of claim 5, wherein the at least one memory further includes instructions that, when executed by the at least one processor, further cause the system to:
determine the first data includes a first sample user input representing a first natural language utterance used to invoke a first skill; and
determine finite state transducer (FST) data corresponding to the first sample user input,
wherein the data structure further includes a second storage location identifier corresponding to the FST data.

9. The system of claim 5, wherein the at least one memory further includes instructions that, when executed by the at least one processor, further cause the system to:
identify, in the NLU model, a second NLU model portion corresponding to a first skill;
determine operation of the NLU model portion will not result in errors corresponding to operation of the second NLU model portion; and
include, in the updated NLU model, the second NLU model portion.

10. The system of claim 5, wherein the first data comprises at least one of:
a many-to-one slot value mapping;
a first sample user input corresponding to a first natural language utterance of an exact match rule; or
a second sample user input associated with a variable token, the second sample user input and variable token corresponding to a pattern match rule corresponding to a second natural language utterance of an exact match rule.

11. The system of claim 5, wherein the at least one memory further includes instructions that, when executed by the at least one processor, further cause the system to:
send the data structure to a read-only access component of the system;
receive, by a preexisting NLU model generation system, second data corresponding to a developer input representing an identifier associated with the data structure;
after receiving the second data and using the identifier, retrieve, by the preexisting NLU model generation system, the data structure from the read-only access component;
using the data structure, generate, by the preexisting NLU model generation system, a second NLU model portion;
determine a similarity between the NLU model portion and the second NLU model portion; and
based at least in part on the similarity, disable NLU models generated by the preexisting NLU model generation system.

12. The system of claim 11, wherein the at least one memory further includes instructions that, when executed by the at least one processor, further cause the system to:
based at least in part on the similarity, disable the preexisting NLU model generation system.

13. A method, comprising:
receiving, from a developer device, first data representing a runtime natural language understanding (NLU) functionality;
generating a data structure representing the runtime NLU functionality, the data structure including a storage location identifier corresponding to the first data;
receiving, from the developer device, second data indicating the data structure is to be incorporated into an NLU model for runtime operation;
using the data structure to generate a NLU model portion; and
generating, using the NLU model, an updated NLU model including the NLU model portion.

14. The method of claim 13, further comprising:
determining the first data includes a first sample user input representing a first natural language utterance used to invoke a first skill; and
determining a second sample user input representing a second natural language utterance used to invoke the first skill, the second sample user input corresponding to a natural language variant of the first sample user input,
wherein the storage location identifier further corresponds to the second sample user input.

15. The method of claim 14, wherein:
the first sample user input corresponds to a first language; and
the second sample user input corresponds to the first sample user input but in a second language.

16. The method of claim 13, further comprising:
determining the first data includes a first sample user input representing a first natural language utterance used to invoke a first skill; and
determining finite state transducer (FST) data corresponding to the first sample user input,
wherein the data structure further includes a second storage location identifier corresponding to the FST data.

17. The method of claim 13, further comprising:
identifying, in the NLU model, a second NLU model portion corresponding to a first skill;
determining operation of the NLU model portion will not result in errors corresponding to operation of the second NLU model portion; and
including, in the updated NLU model, the second NLU model portion.

18. The method of claim 13, wherein the first data comprises at least one of:
a many-to-one slot value mapping;
a first sample user input corresponding to a first natural language utterance of an exact match rule; or
a second sample user input associated with a variable token, the second sample user input and variable token corresponding to a pattern match rule corresponding to a second natural language utterance of an exact match rule.

19. The method of claim 13, further comprising:
sending the data structure to a read-only access component of a system;
receiving, by a preexisting NLU model generation system, second data corresponding to a developer input representing an identifier associated with the data structure;
after receiving the second data and using the identifier, retrieving, by the preexisting NLU model generation system, the data structure from the read-only access component;
using the data structure, generating, by the preexisting NLU model generation system, a second NLU model portion;

determining a similarity between the NLU model portion and the second NLU model portion; and based at least in part on the similarity, disabling NLU models generated by the preexisting NLU model generation system.

20. The method of claim 19, further comprising:

based at least in part on the similarity, disabling the preexisting NLU model generation system.

* * * * *